United States Patent [19]

Stebbings et al.

[11] Patent Number: 5,325,238

[45] Date of Patent: Jun. 28, 1994

[54] METHOD AND APPARATUS FOR HIGH SPEED DUPLICATION OF AUDIO OR DIGITAL SIGNALS

[75] Inventors: David W. Stebbings, North Salem, N.Y.; Jeffrey B. Kadin, Fairfield, Conn.

[73] Assignee: Sony Music Entertainment Inc., New York, N.Y.

[21] Appl. No.: 48,052

[22] Filed: Apr. 14, 1993

Related U.S. Application Data

[63] Continuation of Ser. No. 605,224, Oct. 24, 1990, abandoned.

[51] Int. Cl.⁵ ............................................. G11B 5/86
[52] U.S. Cl. ..................................................... 360/15
[58] Field of Search ........................ 360/13, 15, 8, 74.1

[56] References Cited

U.S. PATENT DOCUMENTS

| | | | |
|---|---|---|---|
| 4,229,770 | 10/1980 | Ito | 360/15 |
| 4,355,338 | 10/1982 | Tamamoto et al. | 360/15 |
| 4,410,917 | 10/1983 | Newdoll et al. | 360/15 |
| 4,899,230 | 2/1990 | Sherritt | 360/15 |
| 5,021,893 | 6/1991 | Scheffler | 360/15 |

FOREIGN PATENT DOCUMENTS 2199984A 7/1988 United Kingdom.

*Primary Examiner*—Hajec: Donald
*Assistant Examiner*—Won Tae C. Kim
*Attorney, Agent, or Firm*—Rosenman & Colin

[57] ABSTRACT

A method of and apparatus for recording information from a master medium onto a slave medium. In one embodiment, digital information on a master medium is reproduced and stored at a first rate, typically at real time, in a first high speed digital storage device such as a magnetic disk drive. The digital information stored in the first storage device, when needed, is transferred at a second rate, much higher than the first, to a second digital storage device in which it is stored until it is scheduled for duplication, at which time the digital information is repeatedly played back at a third rate, much higher than the first rate and slower than the second rate, is converted from digital information into analog information and applied to a duplicating device for recording the analog information onto a slave medium. Because the information stored in the first digital storage device is not directly used in production, the duplicating device can be duplicating information previously transferred from the first storage device to the second at the same time information is being reproduced from a master medium and loaded, in real time, into the first storage device.

22 Claims, 6 Drawing Sheets

Microfiche Appendix Included
(491 Microfiche, 9 Pages)

FIG. 7

```
             CRT DHSM STATUS OF OPERATIONS
    09/05/90                                    16:03:20

LOADER    STATUS    SECTION    SELECTION    TITLE    MINS LEFT
   1
   2
   3
   4
   5

PLAYER    STATUS    SECTION    SELECTION    TITLE    PASSES
   1
   2
   3
   4
   5
   6
   7
   8
   9
  10
```

METHOD AND APPARATUS FOR HIGH SPEED DUPLICATION OF AUDIO OR DIGITAL SIGNALS

This application is a continuation of application Ser. No. 07/605,224, filed on Oct. 24, 1990, now abandoned.

BACKGROUND OF THE INVENTION

This application includes a microfiche appendix consisting of nine (9) microfiche and 491 frames.

This invention relates generally to apparatus for recording information from a master medium onto a slave medium, and, more particularly, to apparatus for transferring audio signals from a master medium, such as a source tape, at high speeds onto a slave medium such as the magnetic tape of an audio cassette.

Heretofore, duplicating equipment for the mass production of prerecorded magnetic tapes containing music or language programs employed a device for reproducing a master or like source and a device for recording the reproduced information on slave tapes. In one approach, a "running master" is installed on a playback device and during playback is advanced as an endless loop through a temporary storage bin. A slave tape in the form of a "pancake" of a length sufficient to replicate many times the programs stored on the endless loop tape is placed on each of several slave transports and moved at a speed which is a synchronous multiple of the recording speed of the original master. The master tape is advanced through the temporary storage bin a sufficient number of times to reproduce the program information on a desired number of segments of each slave tape, which usually is done at a speed which is multiple of the speed of which the information was recorded on the master tape, typically, sixty-four.

The "running master" duplication approach has many drawbacks including breakage both of master and slave tapes which require shutdown to correct, master tape wear which requires frequent replacement and thus the need for many copies of the master, and abrasion of the playback head by the movement of the master tape thereacross with resulting degradation in the frequency response of the system. The cost consequence of such failures is the time lost to stop the duplication process to replace the master tape, replace and/or recue the slave tape to the proper start point, and restart the duplication process.

Another early tape duplicating apparatus for transferring information from a master tape onto plural slave tapes employed a reel-to-reel master tape transport and on play-through the information was recorded on each of the slave tapes. Thereafter, the master had to be rewound and then replayed to transfer the master information to the slave tapes a second time, and so on, an obviously unacceptably slow process for the mass production of prerecorded programs.

A tape duplicating apparatus described in U.S. Pat. No. 4,410,917 to Newdoll et al, addresses the tape wear and breakage problem of such earlier systems and seeks to increase the duplicating speed. In this system, information recorded on master tape, which may be in either analog or digital form, is reproduced from the master medium at the same speed at which it is recorded, normally real time or a small multiple (e.g., two or four) of real time. The reproduced information is stored in a digital storage device (in the analog case after conversion to digital information) at the same rate at which it was reproduced. The digital information is then recovered from the digital store at a rate which is a multiple of the digital recording speed, is converted to analog information and applied to a recording device for recording on a slave medium. The rate at which the digital information is recovered from the digital storage device and applied to the slave tape is not specified, other than that it is faster; however, the described equipment suggests that the multiple was only about six times real time. Furthermore, the method of bit-rate reduction used to achieve this speed puts in doubt the audio quality of the duplicated product.

While Newdoll et al. substantially eliminated master tape wear, and wear and tear of the playback head of the master reproducing device, and achieved some increase in duplicating speed over the prior art systems, the system would be inefficient and impractical in a production environment. Assuming, for example, a typical line in which digital information from the digital store is converted to analog and applied in parallel to fifteen duplicating machines, when the pancakes on the duplicating machines are filled the operator stops them, removes the fully recorded pancakes and reloads the machines with new pancakes. Changing fifteen pancakes and cleaning and lacing up the machines takes about two minutes, not a major loss of time if the production schedule calls for additional replications of the program then stored in the digital store; however, should the schedule call for duplication of a different selection, the master tape, too, has to be changed, and however the program information is recorded, it has to be loaded, in real time, into the digital store. A typical one-hour program, that is, up to thirty minutes on each side of a cassette tape, would take one hour, resulting in a loss of at least fifteen machine-hours of production. This number becomes extremely significant in a major duplicating facility which typically may have seventy selection changes during an 8-hour production shift, of which there may be two and sometimes three per day.

Another tape duplicating system in which analog signals recorded on a master tape are converted to digital form, stored in a digital storage device, and then transferred to slave tapes after conversion to analog form, is described in U.S. Pat. No. 4,355,338. The digital store employs magnetic disks, each having plural magnetic head groups, on which digital signals are recorded on a time-axis compressed basis and driven in parallel to achieve increased signal transfer rate; the patent suggests that slave tapes can easily be obtained in 1/32nd of the normal tape translation speed. This system suffers the same disadvantage as the Newdoll et al. system, namely, that each time there is a selection change the slave machines are idled for the time required to load the new program information, typically an hour for a cassette tape recorded on both sides.

A primary object of the present invention is to provide apparatus for recording information reproduced from a master medium onto a slave tape medium which significantly improves the utilization of the slave tape machines.

Another object of the invention is to provide apparatus for recording information reproduced from a master medium which enables recording of information on the slave medium at the same time that information is being reproduced from the master medium.

It is another object of the invention to provide apparatus for duplicating information stored on a master medium in which master tape wear and tape breakage is essentially eliminated.

Still another object of the invention is to provide a method and apparatus for recording information reproduced from a master medium onto a slave tape medium at signal transfer rates which are large multiples of real time.

A further object of the invention is to provide a large duplicating system having many groups of duplicators each of which groups is capable of reproducing information from different sources and all or a desired number of which may reproduce information from a single source.

SUMMARY OF THE INVENTION

Briefly, these and other objects are achieved by a method and apparatus wherein information recorded on a studio master tape, in either analog or digital form, is reproduced at the speed it was recorded, usually in real time, converted (if necessary) into digital information, and recorded in a first storage device which, for convenience, will be termed a master or intermediate store. This storage device preferably has a capacity for storing digital information representing more than one audio selection (program), it is programmed to either record one side at a time or to simultaneously record both "A" and "B" sides of the cassette product, and has the ability to read out the stored information at a much higher rate than it was read in. The digital information is transferred, when needed, from the intermediate store, preferably via a bi-directional switch matrix, to a second digital storage device, which will be called the head-end store, at a second rate which is a large multiple, typically approximately ninety, of real time; thus, less than about half a minute is required to transfer the digital information for a typical selection, both "A" and "B" sides, either simultaneously or successively, from the intermediate store to the head-end store. The head-end store is of the same type as the intermediate store in that it has the capacity simultaneously to store several selections and the capability of having its stored information read out at high speed, on the order of ninety times real time, for transfer to a line of duplicators.

In use, several selections scheduled for duplication during a production shift may be pre-loaded in the intermediate store, and upon arrival of the scheduled time for commencing replication of a different selection, the digital information for that selection, and succeeding selections if available, are transferred, each in about half a minute, from the intermediate store to a selected storage address in the head-end store, from which the information is recovered at high speed, typically on the order of ninety times real time, and recorded onto the slave medium, which may be, for example, fifteen duplicating machines to the recording heads of which the recovered signals are applied in parallel.

The information recovered from the head-end store may be recorded on the slave tapes in digital form, if desired, or the recovered information may first be converted to analog form for recording onto the slave medium.

An important aspect of the present invention is that since the information stored in the intermediate store is not directly used in production, the duplicating lines can be producing one or more selections previously transferred from the intermediate store to the head-end store at the same time information is being reproduced from a master tape and loaded, in real time, into the intermediate store. This achieves a significant increase in the utilization of the duplicators over what is possible in the described prior art systems in that the slave machines need be shut down, between selections, only for the time the operator needs to change the pancakes and clean the record heads on the duplicating machines, usually about a minute for fifteen machines; thus, the duplicators are not idled by real-time loading of master tape information, a point of considerable economic importance in a tape duplicating facility which must make many selection changes per shift.

Other objects, features and advantages of the invention will become apparent, and its construction and operation better understood, from the following detailed description, taken in conjunction with the accompanying drawings.

BRIEF DESCRIPTION OF THE DRAWINGS

FIG. 7 is a representation of the screen of a computer terminal showing the status of operations of the installation depicted in FIG. 6.

DESCRIPTION OF THE PREFERRED EMBODIMENT OF THE INVENTION

Figure 1:
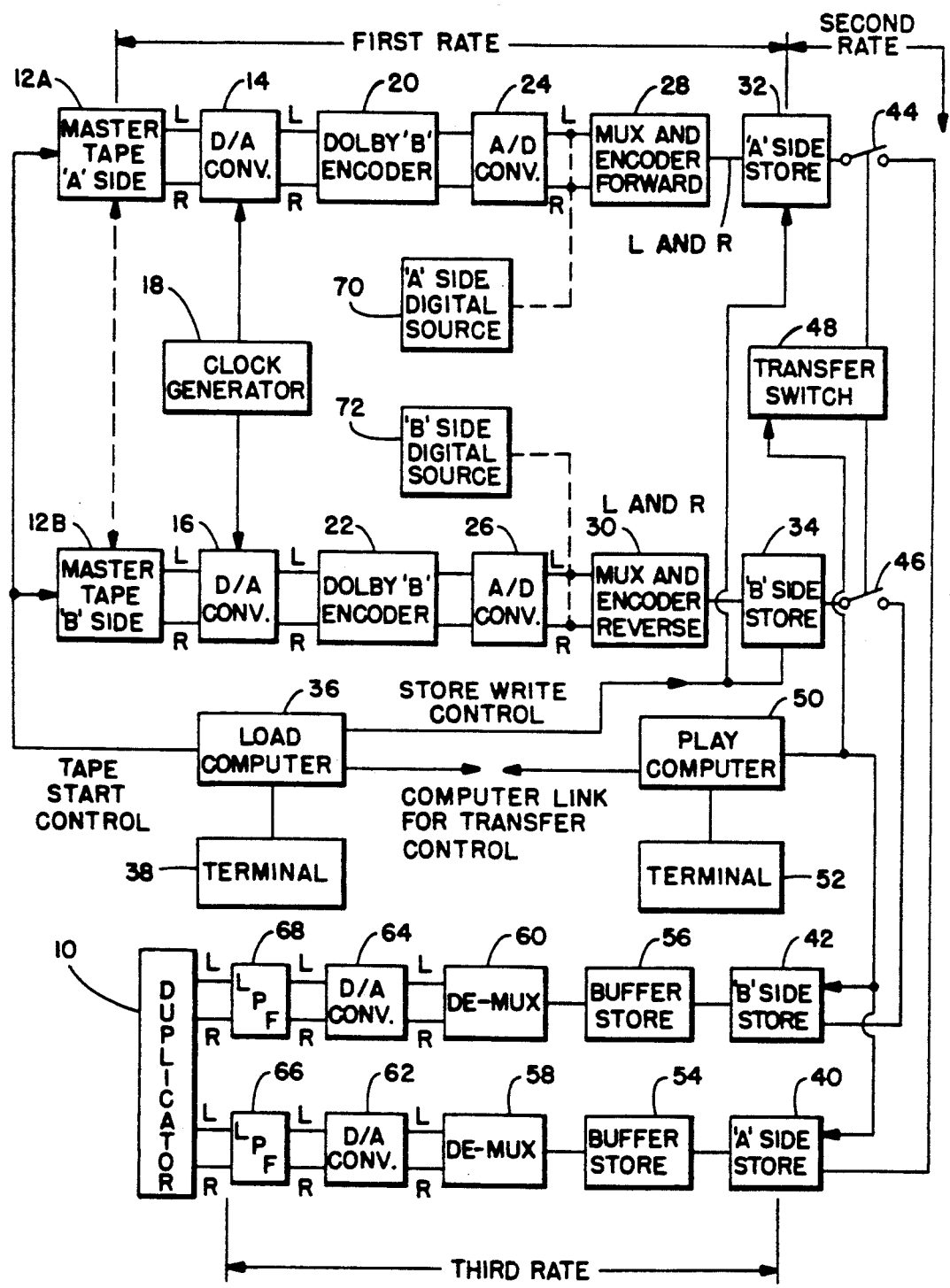
FIG. 1 is a block diagram of apparatus constructed according to the invention for recording on a slave medium information reproduced from a master medium.

FIG. 1 illustrates in block diagram form apparatus embodying the invention for recording on a slave medium 10 information reproduced from master mediums 12A and 12B by respective tape players, respectively representing the "A" and "B" sides of the stereophonic cassette product. The source tape typically would be a digital studio master tape, which would require conversion of the reproduced information signals from digital to analog form to enable them to be Dolby "B" encoded in an analog form of Dolby "B" encoder so that the cassette product will conform with current industry practice of producing cassettes which are Dolby "B" encoded. To this end, reproduced digital signals are converted to analog form by respective digital-to-analog converters 14 and 16, synchronized with each other by clock signals produced by a common clock generator 18, and the resulting analog signals are applied to respective analog Dolby "B" encoders 20 and 22 of known construction. In the event a digital form of Dolby 'B" encoder is developed it could, of course, directly receive the digital signals from the master sources after suitable adjustment of level, and would eliminate the need for D/A converters 14 and 16.

Following Dolby "B" encoding the analog signals, representing the "A" and "B" sides, are converted back to digital form by respective A/D converters 24 and 26 of known construction for further processing. The digital signals representing the "A" and "B" sides are applied to respective multiplexers and encoders 28 and 30 which format the digital left and right channel signals of each side into a form suitable for storage in digital storage devices 32 and 34, respectively. In the "A" side case the storage device 32 is loaded in the normal forward direction and multiplexer 28 packets the digital information in a format suitable for loading in this direction. When the "A" side information has been completely loaded into storage device 32, sometimes referred to hereinafter as a "master store" or "intermediate store", the forward multiplexer 28 is switched off and the other multiplexer 30 is switched on for multiplexing and encoding the "B" side information preparatory to loading it in the "B" side store 34. Because the "A" side and "B" side master tapes 12A and 12B travel in the same direction as they are being reproduced to generate the digital information, whereas during playback of the tape cassette the "B" side travels in a direction opposite that of the "A" side, during recording of the slave tapes 10 the data representing the program on one side must be reproduced from the digital store in reverse; to this end MUX and encoder 30 packets and applies the "B" side digital information to storage device 34 in reverse, forwardly from the back toward the front end of the file.

The described process of loading stores 32 and 34 is controlled by a load computer 36 programmed to determine the size and location of the files in which the information is stored, to turn multiplexers 28 and 30 on and off at the appropriate times, to start and stop the master tape players at the appropriate times, and generally to perform all of the functions necessary to accomplish loading of the program information into the master stores. Microfiche copies of the printout of a program entitled "DHSM LOAD PROGRAM", designed to control magnetic disk drive storage devices (to be described) and of an ancillary program entitled "Shell Program To Run Loading Programs" are attached hereto and marked "Appendix I" and "Appendix II", respectively. The digital information is loaded into the master stores at a first relatively slow rate, typically the rate at which the program information was originally recorded on the studio master tapes, normally real time.

When it is desired to duplicate the "A" and "B" side information stored in stores 32 and 34, the data is transferred at a second rate, much higher than the first rate, to head-end "A" and "B" side stores 40 and 42, respectively, by closure of the switches schematically shown at 44 and 46 by a transfer switch 48 which, in turn, is controlled by a load computer 36 linked to a play computer 50 and programmed to transfer information from intermediate stores 32 and 34 to head-end stores 40 and 42 at high speed and in the proper order. The transfer process will be described in more detail later.

Upon completion of the transfer of the data and reopening of switches 44 and 46 it is possible for two things to happen: the program information stored in the head-end stores can be read out, under control of computer 50, at a high speed different from the transfer speed, but at a rate which is an exact multiple of the duplication rate of the duplicators 10, typically sixty four or more times real time, and because switches 44 and 46 are open and there no longer is a need for play computer 50 to communicate with load computer 36, the load computer can start to load a new program into the intermediate stores 32 and 34. Microfiche copies of the printout of the playback program, entitled "Playback Program for DHSM Project", designed for use with disk drive storage devices, and of an ancillary program for administering the playback program entitled "Shell Program to Run Playback Programs", are attached hereto and marked "Appendix III" and "Appendix IV", respectively.

During high speed replay of the information stored in stores 40 and 42, which is repeated over and over for as many times as needed to produce the desired number of replications, the information is applied to respective buffer stores 54 and 56 of known construction which smooth out intermittent flow of data from stores 40 and 42, the reason for which will be more fully explained later, and produce output bit streams at a constant rate. These bit streams are applied to respective demultiplexers 58 and 60 which perform essentially the opposite function of multiplexers 28 and 30, namely, to restore the signal information to substantially its original left and right channel form, which is then applied to respective D/A converters 62 and 64, each having associated therewith a conventional recovery low pass filter 66 and 68, respectively, to produce and apply to the duplicator 10, which, for example, may comprise fifteen conventional slave tape drives, four analog signals representing left and right channels for both the "A" and "B" sides of the cassette tape to be produced. The audio band of the filters, which is the duplication rate times the audio bandwidth of the duplicated tape, typically 15 kHz, in the case of a duplication rate of eighty times real time would be approximately 1.2 MHz.

The load and play computers 36 and 50 each has a terminal 38 and 52, respectively, including a keyboard for controlling the functions outlined above. The system is menu driven in that prompts appear on the terminal screens which asks the operator which function he/she wishes to perform; for example, Do you wish to load? Do you wish to transfer? Do you wish to duplicate at high speed? Also the title of the program, its length, and other information concerning the program is entered via these terminals and keyboards.

The system is also capable of duplicating at high speed program information available in the form of "A" side and "B" side digital tapes 70 and 72, respectively, shown in dotted lines in FIG. 1, which may or may not be Dolby "B" encoded, but typically would have been subjected to some bit-rate reduction and pre-mastering preparation, by directly applying the digital information to multiplexers 28 and 30, respectively, for formatting the data preparatory to storage in intermediate stores 32 and 34, respectively. In this case, all of the components preceding the MUXs could be dispensed with, and if the duplicates are to be digital tapes then the D/A converters 62 and 64 and their associated low pass filters would not be required; it would be the function of de-multiplexers 58 and 60 to prepare the signals in a format suitable for recording directly onto the duplicator tapes, typically by dividing the signal into a multiplicity of channels and feeding the signals to a multiplicity of heads arranged in a stack with coincident vertical axes, which would be done with a digital recorder instead of an analog recorder.

It will be evident from the foregoing description that a basic requirement of the system of FIG. 1 is a digital storage device which, in the case of stores 32 and 34 is capable of being read out at high speed, and in the case of stores 40 and 42 of being both loaded and read out at high speed. Until relatively recently, available storage devices couldn't handle bit rates on the order of tens of megabytes per second necessary to fully restore the analog signal and at the same time achieve a high duplication rate. For example, at least fifteen to thirty megabytes per second are required for audio signal replication from sixty-four, to one hundred twenty-eight times real time. Of the several possibilities available today, the currently preferred device is a magnetic disk store having a plurality of side-by-side discs rotating at 3600 rpm, for example, and multiple heads which can simultaneously read in, or read out information which, in effect, provides a multi-channel disk store which has a sufficiently high bit rate. Another potentially usable, but currently more expensive, digital storage medium is RAM or EEPROM devices which have the required speed capability and which in sufficient numbers can provide the requisite storage capacity, and can be read out more easily than mechanical stores. However, because their cost per megabyte of storage currently is on the order of five to twenty times that of magnetic disk storage devices, the latter is utilized in the present system.

Figure 2:
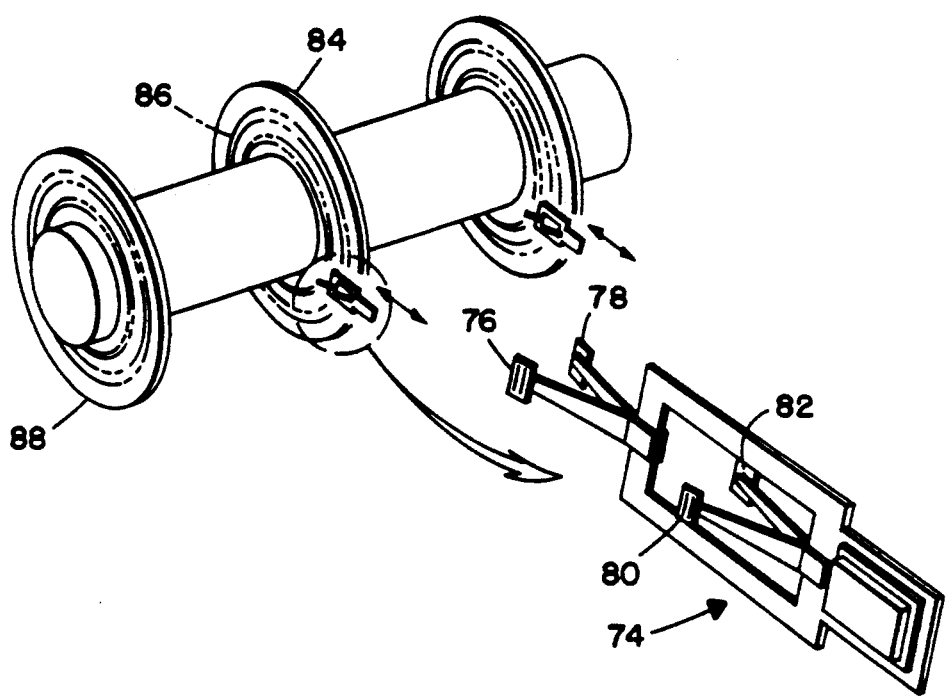
FIG. 2 is a perspective graphical representation of the magnetic disks and read/write heads of a magnetic storage device used in the system of FIG. 1.

In particular, each of storage devices 32, 34, 40 and 42 may be, for example, the Model 1012 magnetic disk drive manufactured and marketed by IBIS Systems of Westlake, Calif., which will now be described in sufficient detail to understand how it is used in carrying out the invention. Referring to FIG. 2, the head/disk assembly of the device comprises three rigid magnetic media disks mounted on a horizontal spindle which is driven in rotation by a D.C. servomotor (not shown) at 3600 rpm. Each of five data surfaces provided by the disks has two concentric storage bands; the outward-facing disk surface at the ends of the stack are dedicated to a single band of tracks of servo reference patterns. The data tracks are magnetically accessed by flying heads carried by a head-positioning system which includes a read/write arm 74 to which four heads 76, 78, 80 and 82 are attached via respective leaf springs; for example, one pair of heads accesses one surface of a disk 84, while the alternate pair of heads accesses the opposing disk surface. Each head accesses a separate band 86 of tracks on each disk surface; therefore, each disk surface has two concentric bands of data tracks. However, only one of the four heads may be active, i.e., either writing or reading, at any instant, otherwise it is passive. The outward-facing disk surface at the end of the stack, which is shown at 88, is dedicated to servo position reference patterns and has only a single band of tracks of twice the density as the data tracks on the other disks; each band is accessed by a single read-only head.

Figure 3:
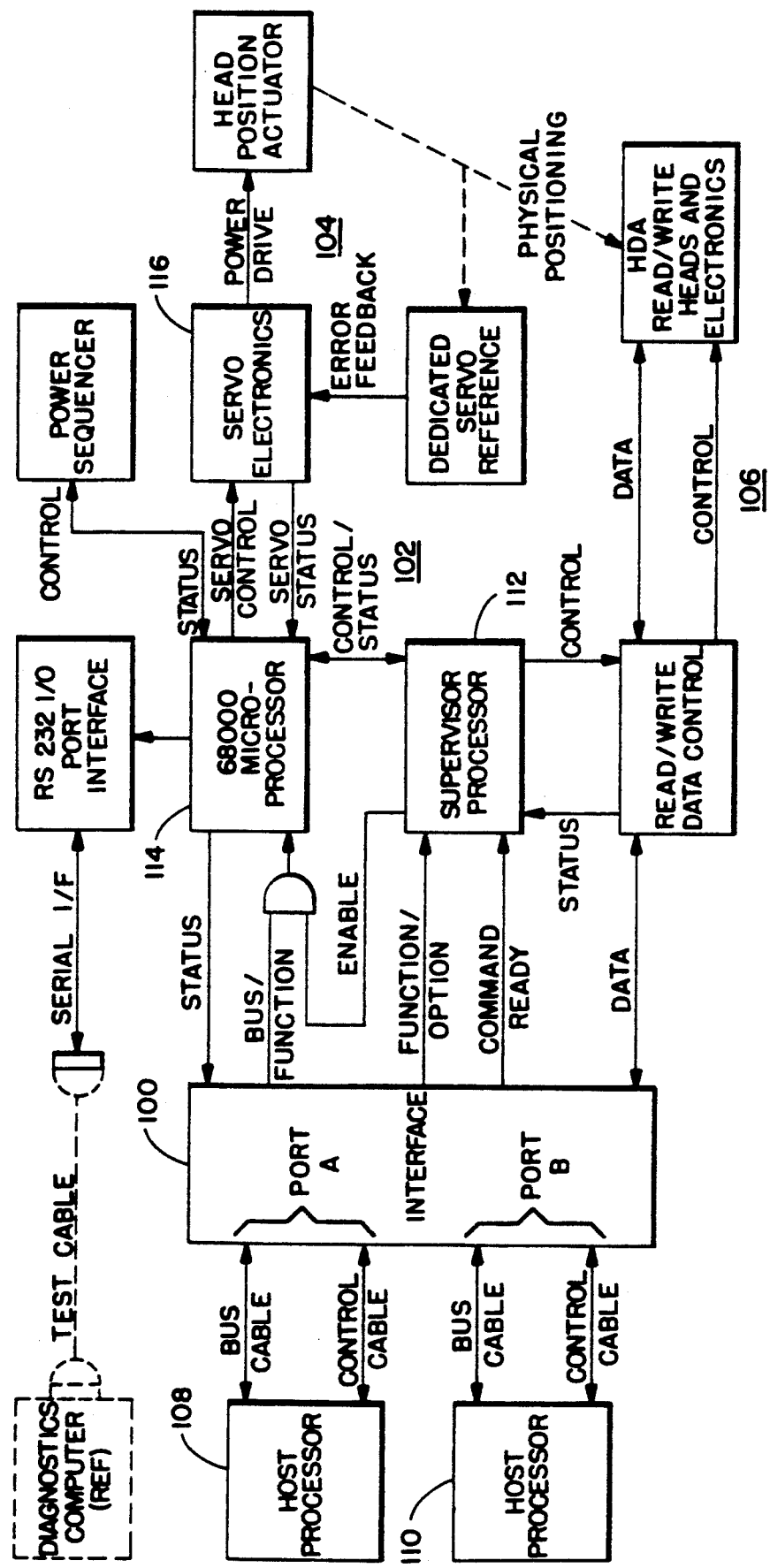
FIG. 3 is a functional block diagram of a system for controlling the magnetic storage device.

Data is transferred to and from the magnetic disks in 16-bit words, which are stored on the disks at precise locations (addresses) by the control system functionally illustrated in FIG. 3. Any defective addresses are effectively removed from use by a flaw-mapping process which is accomplished by a program entitled "DHSM-IBIS FORMAT PROGRAM" a microfiche copy of which is attached as "Appendix V". This system is divided into four basic functional areas: interface 100; microprocessor control 102; head-positioning servo system 104; and write/read system 106. The interface 100 has two ports, port A and port B, that can be connected to respective host processors 108 and 110, each of which can select the drive, but only one of which can be logically connected at a given time. However, the non-selected I/O processor can request selection by issuing a command which, if successful, releases the selected processor and logically connects the requesting processor. Two cables, a bus cable and a control cable, connect each port to its respective processor. The bus cable contains a 16-bit bi-directional data bus, including odd-one's parity, and the control cable contains a five-bit function code bus including odd-one's parity (from the host processor) and status lines from the drive to the processor.

Once a command instruction is received from either of the two input ports, the sequence of events required to perform the commanded functions are controlled by two microprocessors: one is the supervisor 112 and the other is a 68000 (or 68K) microprocessor 114. The principal controller 112 is a one-bit processor which automatically decodes all incoming function codes and controls all high-speed switching necessary to propagate data through the drive to and from the storage media and, in addition, defers head positioning commands to the 68000 microprocessor. The 68000 microprocessor 114, along with its supporting memory, is the master control element for all head position, power sequencing, and safety monitoring. These sequences are relatively slower than those performed by the supervisor 112. The 68K microprocessor 114 is also configured to load portions of its RAM with programmed diagnostic sequences via a serial RS232 port, thus permitting the drive to perform fault-isolation self-testing. A servo electronics unit 116 comprises the head-positioning system discussed above in connection with FIG. 2.

Figure 4:
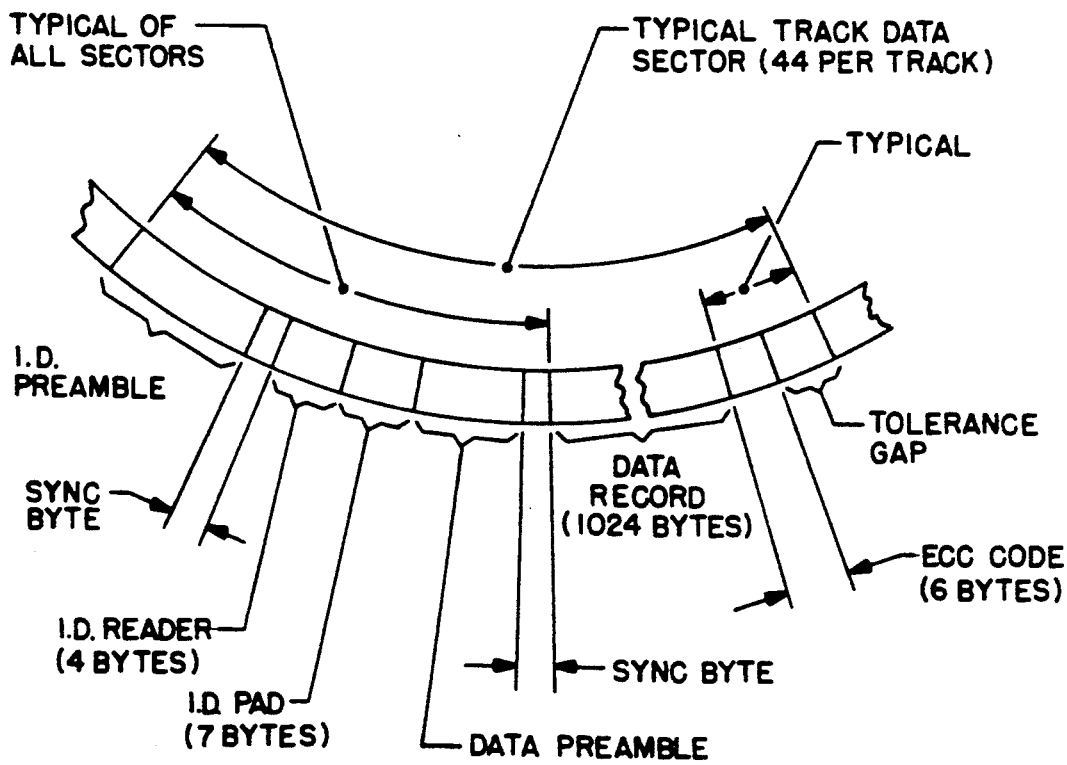
FIG. 4 is a sketch illustrating how data is formatted on the magnetic disks of the storage device.

As is common in disk based data storage systems, the data is formatted into sectors as shown in FIG. 4, this being the smallest accessible block of data, which are sequentially written starting from one end of and continuing to the other end of a logical disk. As files are successively written the disk fills towards one end. Deletion of a file interposed between two other files creates a blank in the data, and the next file to be written will use the sectors made available by the deleted file. Should this new file be larger in size than the deleted file some of the data will be stored in the area previously occupied by the deleted file and the remainder will be stored in the closest available space. If many files are already stored on the disk, it may be necessary to store the remainder at one or more locations physically and logically separated by considerable distances from other parts of the file. This process of breaking up and spreading files, known as fragmentation, while tolerable in most computer systems, slows the data transfer rate to a degree that it is unsuitable for high speed data processing. Computer systems which mix high speed data files with normal speed data files employ a special algorithm which puts the high speed data in contiguous data areas and only fragments normal speed files.

In the present system, all files are high speed files and, for reasons which will shortly become apparent, must all be contiguous; an important aspect of the present invention is an algorithm for ensuring that all files are contiguous in a magnetic disk store specifically adapted for the high speed duplication of audio or digital signals. In the audio signal case, files of data which are digital representations of music selections, are stored on one or more tracks on one or more of the magnetic disks of the drive. These selections have a playing time per side in the range between five minutes and forty-five minutes, the average playing time for normal selections being approximately twenty-five minutes, and the average for "cassette-singles" is about five minutes. Relatively few selections are longer or shorter than these averages. Based on these statistics of the file sizes to be encountered, this algorithm, which is embodied in the above-mentioned "DHSM LOAD PROGRAM" and others, partitions the drive into sections of files each having a playing time slightly longer than the average program length. The majority of programs are shorter or equal to the playing time of the sections so they may be recorded and erased without causing any fragmentation. In the event a selection is longer than the allotted section length, the algorithm automatically allows the selection (program) to overlap into the next contiguous section, thereby to produce one long file, even though only a part of the adjacent section may be used to store the portion of the program which exceeds the length of a section. When this file is deleted, both sections are freed for further use without causing any fragmentation. For these reasons, all master stores and head-end stores are organized in the same fashion. In this way all files are contiguous and can be read out at the high speeds essential for operation of the tape duplicating system. Furthermore, the partitioned files can handle the loading of the continuous flow of new programs that must be loaded and transferred to the head end store for use in duplication. Without this system of organization of the data, fragmentation of the files would quickly lead to chaos and slow the rate of data transfer to such a degree that the system would not be usable; with the described organization the drive has the ability to handle up to forty-eight different selections a day.

Briefly reverting to FIG. 1, the digital multiplexed signal L and R from MUX 28 representing the "A" side is applied to the "A" side store 32, and the multiplexed L and R digital signal from multiplexer 30 representing the "B" side is applied to a second magnetic drive store 34. The multiplexed signals are transmitted as 16-bit words to the I/O port of the disk drive (FIG. 3) and laid down on prescribed tracks on one or more of its magnetic disks. Because of the large number of heads it is possible to simultaneously record and interleave data so as to provide very fast data rates, both in and out. The available high speed is not utilized during the loading process, however, which is done at a rate equal to the rate at which the information was originally recorded on the master, normally but not necessarily real time; thus, since the disks are spinning at a uniform speed of 3600 rpm during loading, the system is inactive most of the time because the data from multiplexers 28 and 30 is gathered into blocks of several packets of 4,096 bytes each and at the appropriate point is quickly dumped onto the storage disk with the L and R channels of each side interleaved within each packet. The program of the load computer 36 organizes the data for transfer into the stores 32 and 34 and is controlled by an operator at terminal 38, which preferably is physically located in proximity to the master tape players 12A and 12B. As mentioned previously, the load computer is programmed to direct the supervisor processor 112 (FIG. 3) to "start laying down the data from track number XXX to data area number YYY", and to perform other normally required control functions.

Because the magnetic store is very fast, but needs to be used only for a small fraction of the time during the loading process, it is capable of performing another useful feature of the system, namely, to load "A" and "B" sides of the cassette product in opposite directions. This is not a straightforward task when it is considered that the "A" side and "B" side master tapes travel in the same direction as they are being reproduced to generate the digital information applied to the stores, whereas during playback of the ultimate cassette product the "A" side travels in the opposite direction to the "B" side. This being so, as a slave tape is being recorded the data representing the program on one of its sides must be reproduced from the digital system in reverse to the data representing the other. This could be done quite easily with an electronic RAM or similar memory in which by simply addressing the memory in the reverse order the data could be stored in one direction and played back in reverse. In the disk drive used here, however, the data is packeted in sectors, and these can be recorded or read out in only one direction as governed by the direction of rotation of the disks. There being no practical way for reading data from a sector in the direction opposite from that at which it was laid down, a combination of external hardware and software is employed to reverse the data for one of the sides, in the present embodiment, the "B" side of the cassette product. The necessary software is embodied in the "DHSM LOAD PROGRAM" (Appendix I).

To achieve the high playback data rates needed for rapid transfer of data from the intermediate stores 32 and 34 to the head-end stores 40 and 42, the sectors must be read in a specific incremental manner; otherwise unacceptable gaps will appear in the data stream as the disks rotate under the heads because of the waiting time for the next correct sector to appear. Therefore, reversal of the data stream, say for the "B" side of the cassette product, is most effectively accomplished during the relatively slow speed loading operation.

Two types of reversal must take place in order to reverse the data in a file: (1) reversal of the order of writing the sectors such that the last sector written is to be the first sector to be read out and the first sector written is to be the last sector read out; and (2) reversal of the data in each sector so that the order of each individual word (16-bit data group) within the sector will be reversed on playback. This is accomplished by writing blocks or groups of data equivalent to eight disk sectors in succession into an electronic memory in one direction and then reading it out in reverse order by reversing the direction of the read address generator. The groups of eight sectors are then written to the disk drive as a block, proceeding from the end toward the start of the file. However, each block of reversed data is written forwardly on the disk drive, with the first sector of the first block written eight sectors from the end of the file, with the second sector written seven sectors from the end of the file, and so on until the eighth sector of the first block is written in the last file position. When the time comes for transferring the next block of eight sectors, the first sector is transferred to a position sixteen sectors from the end of the file, the second sector is transferred to a position fifteen sectors from the end, and so on until the last sector of the second block is positioned nine sectors from the end of the file. By this process the reversed eight sector blocks are each recorded on the disk writing forward, each starting eight sectors before the start of the previous block, and is continued until the last block is placed at the beginning of the file. The system is also programmed to write an eight-section block starting at the end of the file, thereby to load the drive with a true reversed copy of the "B" side. On playback, the data on the disk is read out forwardly in the same way that data for the "A" side is read, so as not to compromise the speed of data flow to the head-end stores.

It will have become evident that if the "A" and "B" sides of the cassette product are each of average length and the master tapes 12A and 12B are reproduced sequentially, it would take less than an hour to load the two selections into the respective intermediate stores 32 and 34. The described IBIS drives have capacity sufficient to store information representing selections in addition to the data reproduced from master tapes 12A and 12B; in fact, each has the capacity to store five different selections each about twenty-six minutes long.

While the data representing one or more programs may be stored indefinitely in the high speed stores 32 and 34, the stored data is usually promptly transferred, via switches 44 and 46, to a second pair of high speed stores 40 and 42 of the same type, for the "A" and "B" side data, respectively, under the control of the load and player computers 36 and 50 and two transfer programs entitled "Transfer Program for DHSM Project" and "High Speed Transfer Program for DSHM Project" attached hereto and marked "Appendix VI and Appendix VII", respectively. In the transfer process, the roles of the load and player computers are reversed in the sense that computer 36 is now playing out data at high speed and computer 50 is loading data into the head-end stores. The information stored in "A" and "B" stores 32 and 34 is transferred to stores 40 and 42, respectively, not in real time, but at a much higher rate which, for the described drive is approximately ninety times real time. For other drives which have a capability of yet higher data transfer rates, the transfer rate would be correspondingly higher. It may not be necessary in some installations to transfer the data that fast; for example, it may be more convenient that the transfer rate be only thirty-two times real time. The important point is that the transfer time from the intermediate stores 32 and 34 to the head-end stores 40 and 42 to make the data available to the duplicators, does not interfere with production by completing the transfer before the duplicators have been prepared to accept the next program. The head-end stores 40 and 42 also have capacity to store a multiplicity of programs; for example, each may have five files each capable of storing a 26-minute selection. It is convenient, but not essential, to arrange that the length of the head-end player files is the same as those in the master store, particularly in a system with a multiplicity of master and player stores. This simplifies the exchange of programs from store to store. Again, the information transferred to stores 40 and 42 can be stored indefinitely and, indeed, it is often desirable to store for extended periods program selections that are scheduled for duplication from shift to shift, or week to week, so as to avoid having to take the selection(s) through the time-consuming real time loading process.

As the scheduled time for starting a production run of the program stored in head-end stores 40 and 42 approaches, the operator changes the tape pancakes on all of the duplicators for that line, which may be one or a plurality, typically fifteen, and when satisfied that everything is set up and ready enters an appropriate instruction into the terminal 52 of play computer 50, which preferably is physically located near the duplicator line.

Figure 5:
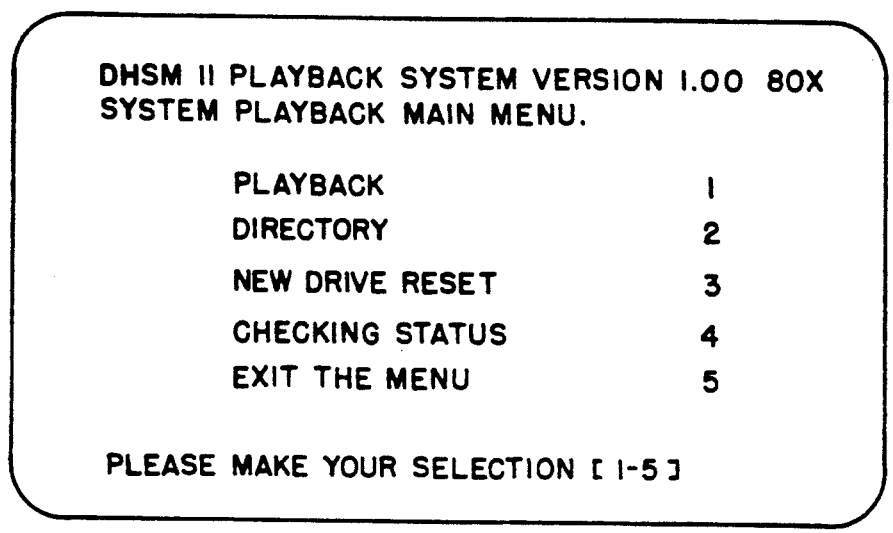
FIG. 5 is a representation of the screen of a computer terminal showing an example of a menu for operating the system.

The operator is guided by a playback main menu, reproduced in FIG. 5, which is called up and presented on the screen of terminal 52 preparatory to initiating playback from stores 40 and 42. It is seen that the display instructs the operator to select from one of five possible items, namely, PLAYBACK, DIRECTORY, NEW DRIVE RESET, CHECKING STATUS and EXIT THE MENU; when a choice is made the computer calls up and presents on the screen an auxiliary, or menu, program appropriate to the menu choice, including a "DHSM-DIR PROGRAM", a microfiche copy of which is attached hereto and marked "Appendix VIII". The DIR program, which is designed for use in an installation including five intermediate stores and ten head-end stores (to be described in connection with FIG. 6) presents on the screen what selections are stored in which sections on a particular drive and contains information entered by the operator during the loading process, such as title, the selection number, the length of the selection in minutes, and the size of the file required to store it. During transfer of a selection from an intermediate store to a head-end store, this directory information is transferred along with the program data to the head-end drive to which the data representing the selection is transferred. In this way, the identity of all the program in storage always accompanies the audio program data so as not to be lost in the event of power failures or shutdowns for other reasons.

Upon selection of "PLAYBACK", the DHSM Playback program (Appendix III) simultaneously starts all of the slave recorders and at the same time initiates readout of the program information stored in "A" and "B" side stores 40 and 42. The data is read from stores 40 and 42 at a third rate, different from both the first and second, which may be sixty-four, seventy-two, eighty, or more times real time, is demultiplexed in respective demultiplexers 58 and 60 to recover the L and R channel information of the respective sides, is converted to analog information by respective D/A converters 62 and 64 and then is applied in parallel to the record heads of all of the duplicators in the line.

Obviously, the higher the duplication rate the larger the number of cassette tapes that can be made in a given time, so there always is pressure to raise the duplication rate which, however, is ultimately limited by the mechanical properties of the duplicators. For example, at a data rate eighty times real time the slave tape has to travel at 150 inches per second in order for it to be played back at the 1⅞ inches per second tape speed of consumer-type tape players. At this and higher speeds the feed and takeup pulleys of the duplicator have to be very carefully regulated to prevent jerking and snapping of the tape; also, at these speeds the head-to-tape contact area is adversely affected by aerodynamic problems. The rate at which data is read from stores 40 and 42 is determined by dividing the clock speed of D/A converters 62 and 64 by the clock rate of A/D converters 24 and 26 at which the audio signal was first sampled, subject to the proviso that the stores 40 and 42 must be capable of supplying data at a rate faster than the desired output rate; otherwise, one quickly runs out of data before the selection is finished, which would produce "gaps" or "skips" in the audio cassette product.

The playback program causes stores 40 and 42 to read the recorded information for both "A" and "B" sides to come out in proper order, and when the end of the longest selection is reached, to jump back to the start of the "A" and "B" side files and repeat the process over and over again until the number of replications instructed by the operator have been made, or for other reasons the duplicators are shut down, such as replenishment of tape pancakes. As is conventional, at each finish of the read out program the computer automatically inserts a tone on the tape so that when the recorded pancakes go onto winding machines for filling cassettes, detection of the low frequency tone can be employed to insure that the tape is cut at the right place.

Figure 6:
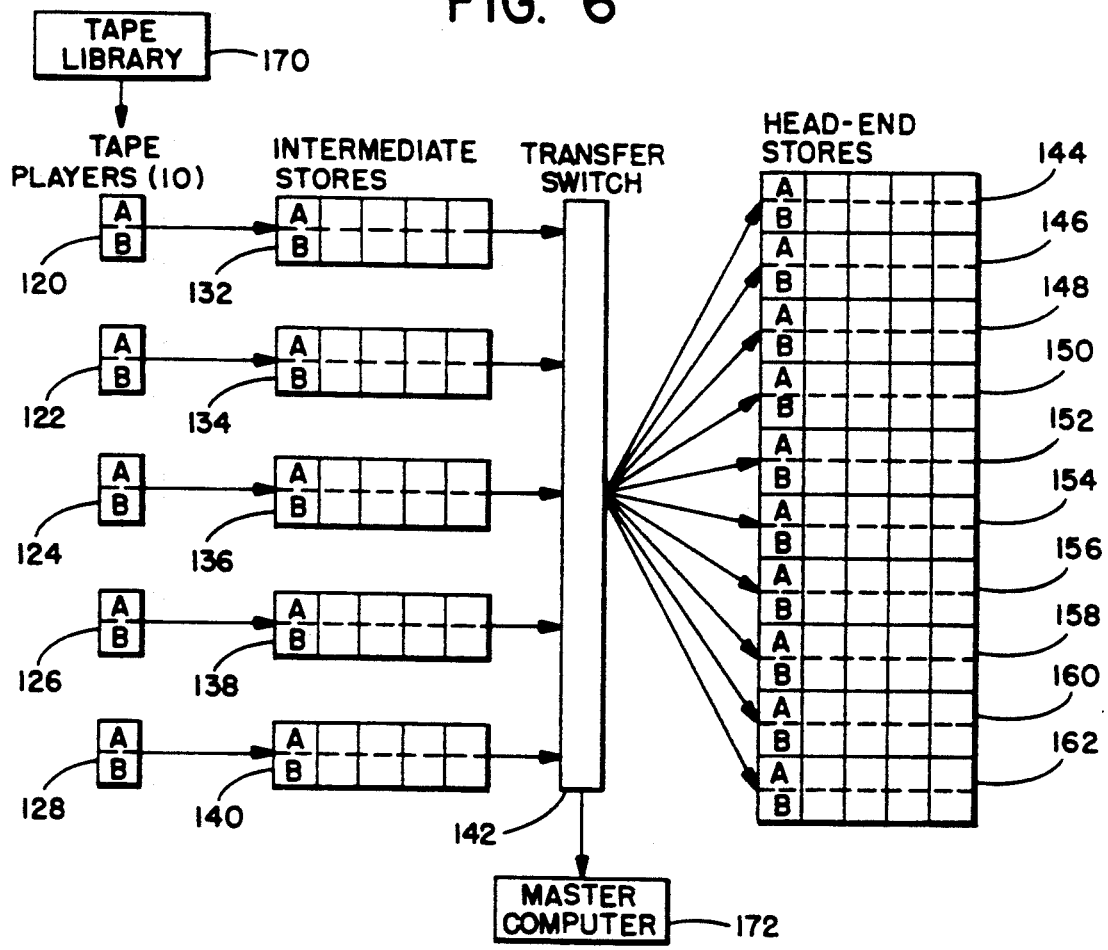
FIG. 6 is a diagram which illustrates an installation consisting of several systems of the kind shown in FIG. 1.

Whereas FIG. 1 illustrates a single complete tape duplicating system that may be adequate for low-volume facilities, a larger facility encountering many selection changes and requiring a large daily output of recorded cassettes may choose to utilize a multiplicity of such systems in the representative installation schematically illustrated in FIG. 6. The illustrated arrangement includes five pairs of source tape players 120-128, each pair corresponding to the players 12A and 12B in FIG. 1 and each of which may be operated independently of the others as well as at the same time that others are operated. The information reproduced by each player is processed as described in connection with FIG. 1 and loaded at slow speed, e.g., in real time, into a respective IBIS storage device, shown arranged in pairs 132-140, each having five files of storage each capable of storing a selection at least twenty-six minutes long. The outputs of the storage devices are all applied to a transfer switch 142 which, unlike switch 48 in FIG. 1 that only couples intermediate sores 32 and 34 to respective head-end stores 40 and 42, is capable of switching data stored in any file of any of the intermediate stores 132-140 to any desired one of the five storage files of any one of ten different head-end stores 144-162, each comprising a pair of the above-described IBIS drives. Thus, the illustrated installation comprises a total of thirty magnetic disk storage devices and the signal processing circuitry required for each.

Transfer switch 142 is a high speed digital crosspoint type switching system which has the ability to handle data rates on the order of ten megabytes per second for each "A" and "B" side pair of stores, for a total of twenty megabytes per second, to effect transfer from the intermediate stores to the head-end stores at a data rate ninety times real time. The switch preferably comprises a multiplicity of conventional tri-state buffers the inputs and outputs of which are connected by a respective parallel bus having twenty-five conductors to each intermediate store and each head-end store, so as to have paths for control data in addition to the sixteen needed for the parallel transfer of 16-bit data words. Under control of the data transfer programs (Appendices VI and VII), the tri-state buffers associated with the 16-bit line connected to the intermediate store from which data is to be transferred are enabled, and on the output side another set associated with the bus that is to carry the data to one of the ten head-end players are also enabled. For example, the tri-state buffers associated with intermediate store 136 and head-end store 154 may be enabled; at that time all other switches are off or disabled. The control leads of the buses provide handshaking between the controller for each store, as is common practice in high speed data transmission systems. Preferably, transfer switch 142 is bi-directional so as to be able to transfer data back and forth between the intermediate and head-end stores.

Each of the head-end stores 144-162 is connected to a respective duplicator line each of which, as was indicated in the description of FIG. 1, may comprise fifteen slave recorders.

The FIG. 6 diagram graphically depicts the flexibility and versatility made possible by the off-line loading of master tape information in any of the intermediate stores 132-140 and the use of a bi-directional switch 142 for transferring data back and forth between the intermediate and head end stores. Programs which have been scheduled for replication are temporarily removed from a tape library 170 and reproduced either sequentially or simultaneously on one or more of the five pairs of tape players 120-128 and loaded, in real time, into selected files of the storage channels of high speed stores 132-140. With the "A" and "B" sides reproduced simultaneously, the elapsed time between the start of the tape players and the time the information is loaded into an intermediate store is the length in minutes of the longest side; this means that if all five pairs of tape players are operated at the same time, and the longest selection is twenty-six minutes, and the "A" and "B" sides reproduced by each pair of players are simultaneously loaded in respective intermediate stores, then the data for ten sides (five complete programs) can be loaded into the intermediate stores in twenty-six minutes. Clearly, if the "A" and "B" sides are reproduced sequentially it will take fifty-two minutes to load five complete programs.

Under control of computer 172, which functionally corresponds to load and play computers 36 and 50, respectively (FIG. 1), programmed to respond to instructions entered on an associated terminal, transfer switch 142 routes data stored in a given file in any of the five intermediate stores to a selected one of the fifty files in the head-end stores 144-162, which one depending upon availability according to the pre-arranged production schedule.

Figure 8:
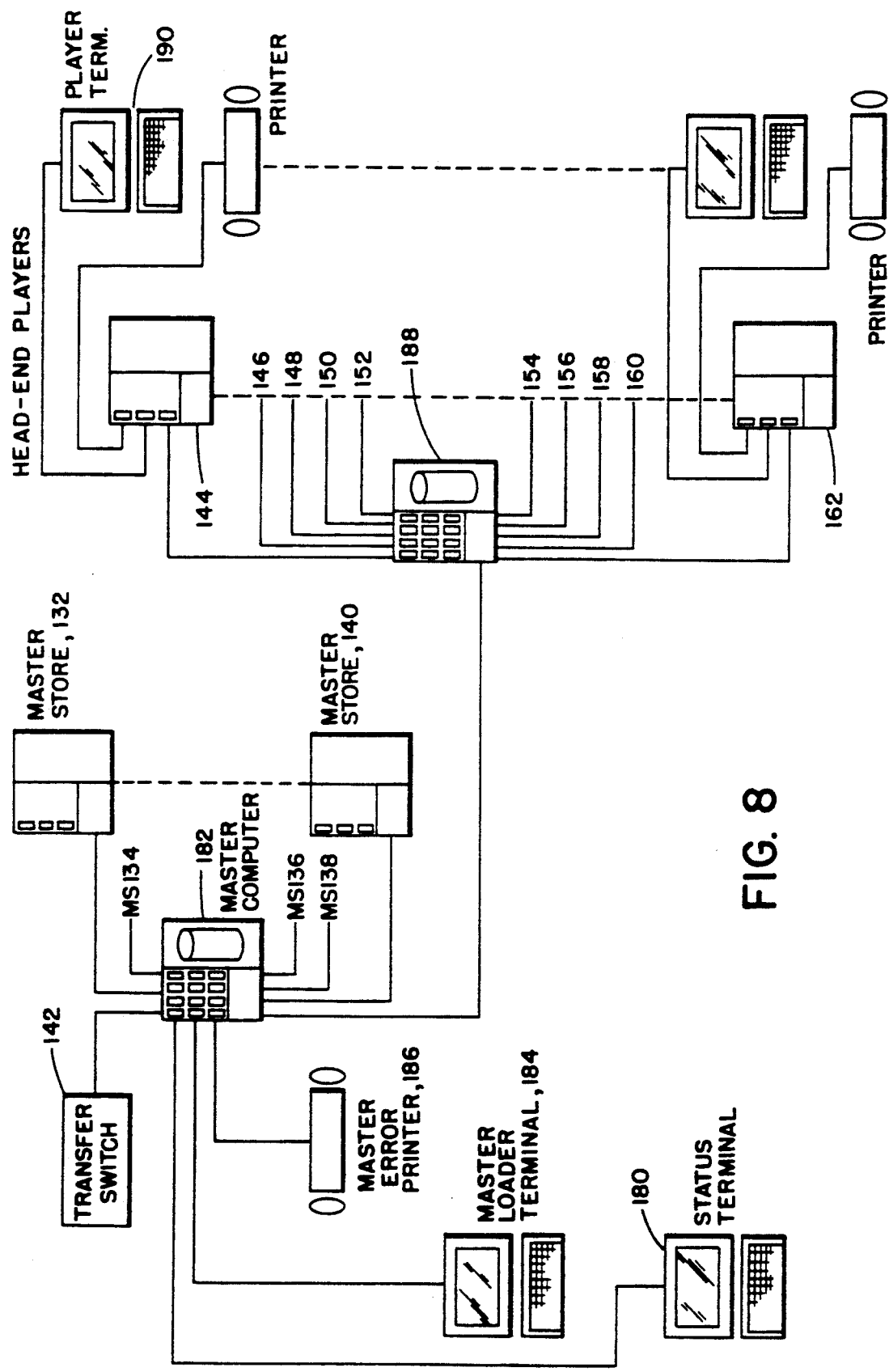
FIG. 8 is a schematic diagram showing the serial port connections of a system for computer control of the installation schematically shown in FIG. 6.

To achieve the described flexibility and high rates of data transfer and at the same time maintain high quality cassette product, the installation depicted in FIG. 6 is controlled by a system of computers programmed as described to perform the functions discussed above. Fast computers are required to execute the many high-speed instructions needed to control the system, such as a 68010VME single board computer. FIG. 8 is a diagram of the RS-232 connections of the digital high speed master (DHSM) system depicted in FIG. 6, these being the serial data links by which different parts of the system communicate with each other. A status terminal 180 connected to a master computer 182 (which corresponds to load computer 36 in FIG. 1) displays the current state of the overall system in the format shown in FIG. 7, including the current operation of each loader and each head-end player, i.e., whether it is loading, playing back, transferring data or is idle, and to which section, the title and number of the selection being replicated, the minutes of storage time remaining for completion of a load in a particular intermediate store, and the number of duplicates already made by each of the head-end players. The status terminal is preferably positioned in a loading room, separate from the production floor, for enabling an operator to know when a transfer from an intermediate store to a head-end player can be initiated which, of course, would require that both a head-end player and a transfer switch be idle. A status terminal might also be installed in a supervisor's office to enable monitoring the operation of the whole system.

An operator of a master loader terminal 184 (which corresponds to terminal 38 in FIG. 1) initiates the loading of information reproduced from master tapes to master stores 132-140, as well as transfer between these master stores and head-end players 144-162. Master computer 182 routes all the necessary information via a sub-master computer 188 which compiles all information going to and from the head-end players and routes it into master computer 182.

A master error printer 186, connected to the master computer and typically located in the loading room, stores and prints out a record of any errors encountered in the system, including the nature of the error and where in the system it occurred; this error information is used for quality control and system maintenance.

The transfer switch 142, the digital switch matrix described earlier, under programmed control of master computer 182, makes the necessary connections for transferring data between master stores 132–140 and head-end players 144–162. Each head-end player has an associated terminal and keyboard 190, typically located in the tape duplicating area, for enabling the production operator to choose which one of the possible five stored selections is to be duplicated. Each head-end player also has its own printer 192, which prints any errors and indicates to the operator that something has gone wrong with the duplicating process. The terminal screen is used not only for choosing the selection to be duplicated but also displays the status of its associated head-end player and duplicator line as it is running.

Reverting now to FIG. 1, to insure the quality of the recorded cassette tape, it is important that the system incorporates some form of digital error detection and correction system. While many such schemes are in use in the audio industry with varying degrees of sophistication, the data-rates in the present system are so very high as to make the use of extremely elaborate encoding and decoding algorithms virtually impossible because of the associated encoding and decoding processing times. Furthermore, it is an essential tenet of any error correction system that it should be designed to accommodate the statistical nature of the errors produced by the storage medium. In the case of magnetic media disc drives, or electronic RAM storage, a relatively simple method was employed. However, it was discovered that simple parity bit protection methods were inadequate. To this end, the forward and reverse MUX and encoders 28 and 30 each also includes an error correction encoder which adds to each block of forty-eight bits arriving from the A/D converter eight error-encoding bits which are multiplexed with the data and stored in a respective intermediate store 32 or 34. Upon replay of this data by a head-end player a decoder located in a respective DEMUX 58 or 60 decodes the eight error bits and relates them to the associated data samples coming through to determine if any errors have occurred in either the error correcting bits themselves or the block as a whole. If one bit is in error the decoder not only detects its presence but also identifies and corrects the bit in error. If there are several bits in error the decoder rejects the associated data samples and instead linearly interpolates between previous valid samples to generate new data samples to replace the rejected ones. If, when attempting to perform a linear interpolation the decoder finds that the samples before and after the incorrect sample are also in error, then the decoder will hold and repeat the last valid sample until a completely valid block of samples arrives. This is similar in concept to the mute circuits used in digital tape recorders and CD players, except that instead of muting to zero signal the previous valid value is held; it has been found in practice that there is less audio defect when this is done, and by such means a defect lasting as long as a millisecond or so is most often inaudible to the listener.

Error correction is essential to remove from the final tape product the "pops" and "ticks" which can result from digital errors in the demultiplexed signals applied to D/A converters 62 and 64. If a most significant bit is in error the "pop" amplitude could be extremely high, and while the "pop" caused by a least significant bit may be inaudible, if they occur frequently there will be audible "pops" and "ticks" in the final product. One only has to remember that in practice approximately 2.4 billion bits are processed for each side of a cassette tape each containing an average twenty-five minute program to realize that an error rate of only one part in $10^{10}$ will result in one possibly audible "tick" per side which, in itself, would be objectionable.

Besides increasing the rate while lowering the cost of tape duplication, the present system has the important advantage over the running master method that digitally stored information can be replayed as many times as desired without change in the finished product. Notwithstanding occasional random errors, a stored program can be replayed a million times with the last playing as good as the first, whereas a running master can be replayed a maximum of two thousand times before it must be discarded. Also, the running master contributes a significant amount of noise to the final product, whereas in the digital case there is little if any and, indeed, it is the quality of the cassette tape itself that limits the signal-to-noise ratio of the final product.

Also, a cassette duplicated by the present system produces a better stereo image than one produced by the "running master" method due to the fact that in the digital case the data representing the left and right channels is completely synchronous, i.e., there is no interchannel phase delay, whereas in the "running master" case there may be dynamic interchannel delays in both the master tape which, in addition to those of the final cassette product, together may be as much as 30° to 40°, or more, which adversely affects the accuracy of the stereo image.

While it was indicated in the description of FIG. 1 that the "A" and "B" sides were sequentially reproduced and loaded into respective storage devices, it is possible, and preferable, to reproduce and store both sides simultaneously. To this end, instead of programming load computer 36 with the "DHSM-LOAD PROGRAM" (Appendix I), it is programmed by a similar program entitled "DHSM-SIMULTANEOUS LOADING PROGRAM", a microfiche copy of which is attached hereto and marked "Appendix IX", which may also be administered by the "Shell Program" of Appendix II.

We claim:

1. A method for duplicating on a slave magnetic medium information representing a first pre-recorded program of given duration that is reproduced from a first master medium comprising the steps of:

reproducing from said first master medium information representing said first program;

loading the reproduced information in digital form at a first bit rate into a first digital storage medium having capacity to store in digital form information to represent at least said first program, and storing said information therein until said first program is scheduled for duplication;

when scheduled for duplication, transferring digital information representing said first program stored in said first digital storage medium to a second digital storage medium having capacity to store in digital form information to represent at least said first program at a second bit rate that is much faster than said first bit rate and storing the transferred digital information therein until said first program is scheduled for duplication on a slave magnetic medium;

making a plurality of duplicate recordings of said first program by repeatedly retrieving from said second digital storage medium at a third bit rate much faster than said first bit rate digital information representing said first program stored therein and applying said retrieved information, each time it is retrieved from said second digital storage medium, to a slave magnetic medium which is driven at a speed which is equivalent to said third bit rate;

whereby when a duplicate recording is reproduced in real time the reproduced program will correspond to the program which would result if the corresponding information pre-recorded on said first master medium is also reproduced in real time; and wherein said step of making duplicate recordings of said first program is adapted to be performed concurrently with reproduction of audio information from another master medium and loading of another said reproduced audio information in digital form into said first digital storage medium.

2. Method according to claim 1 wherein the step of making duplicate recoverings on a slave magnetic medium includes the steps of converting the digital information retrieved from said second digital storage medium into analog audio information and making the duplicate recordings in analog format.

3. Method according to claim 2 wherein the audio information on said first master medium is analog information, and wherein the steps of reproducing and loading includes the steps of reproducing at said first bit rate the analog audio information recorded on said first master medium and converting the reproduced analog audio information into digital information for loading into said first digital storage means.

4. Method according to claim 1, wherein the information on said first master medium is digital audio information.

5. Apparatus for duplicating on a slave magnetic medium information representing a first program of given duration that is reproduced from a first master medium comprising:

first digital storage means having capacity to store in digital form sufficient information to represent at least said first program;

means for loading into said first digital storage means in digital form and at a first bit rate information reproduced from said first master medium representing said first program for storage therein until said first program is scheduled for duplication;

second digital storage means having sufficient capacity to store in digital form sufficient information to represent at least said first program and adapted to be loaded at a second bit rate that is much faster than said first bit rate;

means for transferring digital information representing said first program stored in said first digital storage means to said second digital storage means at said second bit rate for storage therein until said first program is scheduled for duplication on a salve magnetic medium; and duplicating means including means for repeatedly retrieving from said second digital storage means at a third bit rate digital information representing said first program and means for applying said retrieved information, each time it is retrieved, to a slave magnetic medium which is driven at a speed which is equivalent to said third bit rate for making a duplicate recording;

whereby when a duplicate recording is reproduced in real time the program will correspond to the program which would result if the corresponding information pre-recorded on said first master medium is also reproduced in real time and for duplicating pre-recorded information representing first and second separate programs, each having a beginning and an end, on a magnetic tape having a first side A and a second side B so that when the tape is later moved in one direction for playback of side A program-representing information the reproduced program will progress from beginning to end and when the tape is later moved in the opposite direction for playback of side B program-representing information the reproduced program will also progress from beginning to end, wherein the program-representing information on said first master medium comprises first and second analog signals representing first and second programs, respectively, both progressing from beginning to end in the same forward direction and intended for duplication on side A and side B, respectively, of a slave magnetic tape medium, and wherein said apparatus comprises:

means for reproducing said first and second analog signals from said first master medium, means for converting the reproduced first and second analog signals into digital side A and side B program-representing signals, respectively, and means for causing said digital side A program-representing signals to be loaded from beginning to end in a first direction in a first digital storage medium of said first digital storage means and for causing said side B program-representing signals to be loaded from end to beginning in a second digital storage medium of said first digital storage means.

6. Apparatus for duplicating pre-recorded information as claimed in claim 5 wherein said duplicating means includes digital-to-analog converter means for converting said retrieved digital information to analog information for making the duplicate recordings in an analog format.

7. Apparatus as claimed in claim 5, wherein the information on said master medium is analog audio information, and wherein said means for loading information into said first digital storage means comprises means for reproducing from said master medium analog information which represents a first audio program and analog-to-digital converter means for converting the reproduced analog information into digital information for loading into said first digital storage means.

8. Apparatus for duplicating pre-recorded information as claimed in claim 5, wherein said first and second digital storage means each comprises at least one high speed magnetic disk drive into which and from which digital information signals can be loaded and retrieved, respectively, at a bit rate at least as fast as said second bit rate, and in which said digital information is stored in sectors on rotatable magnetic disks.

9. Apparatus for duplicating pre-recorded information as claimed in claim 5, wherein said first and second digital storage means each comprises random access memory means into which and from which digital information signals can be loaded and retrieved, respectively, at a bit rate at least as fast as said second bit rate.

10. Apparatus as claimed in claim 5, wherein said means for transferring digital information between said first and second digital storage means includes digital switch means for routing digital information stored in a predetermined storage location in said first digital storage means to a predetermined storage location in said second digital storage means.

11. Apparatus as claimed in claim 10, wherein said digital switch means comprises bi-directional digital switch means adapted to transfer digital program-representing information back and forth between said first and said second digital storage means.

12. Apparatus for duplicating first and second signals representing separate audio programs, each having a beginning and an end, on a slave magnetic tape having a first side A and a second side B so that when the tape is later moved in one direction for playback of side A program-representing information the reproduced audio program will progress from beginning to end and when the tape is later moved in the opposite direction for playback of side B program-representing information the reproduced audio program will also progress from beginning to end, said apparatus comprising:

first digital storage means having at least first and second separate storage areas;

means for reproducing from a master library source first and second signals respectively representing a side A audio program and a side B audio program in which the program information of both progresses from the beginning to end in the same direction;

means for applying said side A program-representing signals to said first digital storage means in digital form for storage from beginning to end in one direction in a first storage area thereof and means for applying said side B audio program-representing signals to said first digital storage means in digital form for storage from end to beginning in a second storage area thereof;

second digital storage means having at least first and second separate storage areas;

means including digital switch means for transferring said digital side A and side B program-representing signals from the first and second storage areas of said first digital storage means to a first and to a second storage area, respectively, of said second digital storage means; and duplicating means including means for retrieving said digital side A and side B program-representing signals from said second digital storage means, and slave recorder means for driving a slave magnetic tape in a first direction at a predetermined speed and simultaneously recording said side A and said side B program-representing signals from beginning to end and from end to beginning on sides A and B, respectively, of said tape in a single pass.

13. Apparatus as claimed in claim 12, wherein the information reproduced from said master source is digital information.

14. Apparatus as claimed in claim 12, wherein said information signals reproduced from said master library source are analog information signals, and wherein said means for applying said reproduced signals to said first digital storage means includes means for converting analog signal information to digital signal information.

15. Apparatus as claimed in claim 12, wherein said first and second digital storage means each comprise a high speed magnetic disk drive and said first and second storage areas each comprise a predetermined portion of a respective magnetic disk drive, into which and from which digital signal information can be loaded and retrieved, respectively, at high bit rates, each of which disk drives has a capacity for storing a plurality of different side A and side B audio programs, whereby several audio programs scheduled for duplication during a production shift may be pre-loaded in said first digital storage means and at scheduled times transferred one at a time to a predetermined storage area of said second digital storage means for later retrieval and recording on a slave magnetic tape.

16. Apparatus for duplicating first and second audio program-representing signals, each having a beginning and an end, recorded on a plurality of master sources on a slave magnetic tape having a first side A and a second side B so that when the tape is later played back by moving it in one direction for reproduction of the side A program-representing information the reproduced audio program will progress from beginning to end and by later moving the tape in the opposite direction for reproduction of the side B program-representing information the reproduced audio program will also progress from beginning to end, said apparatus comprising:

a first plurality of digital storage means, each plurality comprising first and second digital storage devices, each of said first and second storage devices having a multiplicity of separate storage files each having capacity for storing digital signals representative of an audio program;

means including a plurality of reproducing means equal in number to said first plurality of digital storage means each for reproducing from a respective master source a pair of first and second information signals respectively representing side A and side B audio programs both progressing from beginning to end;

means for applying each pair of reproduced side A and side B information signals as digital information signals each to a separate storage file of respective first and second digital storage devices at a first bit rate, wherein all program-representing information for each side A program is stored from beginning to end in one direction and the program-representing information for each side B program is stored from end to beginning;

a second plurality of digital storage means each plurality comprising third and fourth digital devices, each of said third and fourth digital devices having a multiplicity of separate storage files, each having capacity for storing digital signals representative of an audio program;

means including digital switch means for transferring digital information signals stored in a storage file of said first digital storage device representing a side A audio program and for transferring digital information stored in a storage file of said second digital storage device representing a side B audio program each to a separate storage file of a third and a fourth digital storage device, respectively, at a second bit rate much faster than said first bit rate; and duplicating means including circuit means for repeatedly retrieving said digital side A and side B program-representing signals from said third and fourth digital storage devices at a third bit rate and applying said retrieved signals, each time they are retrieved, to a slave magnetic tape medium of one of a multiplicity of slave recorder means, at least one for each pair of third and fourth digital storage devices, which is driven at a speed which is equivalent to said third rate for making duplicate recordings of said side A and side B program-representing signals on sides A and B, respectively, of said tape in a single pass;

whereby the duplicated signals when reproduced in real time will correspond to the master medium information signals when also reproduced in real time.

17. Apparatus for duplicating audio program-representing signals as claimed in claim 16, wherein said first, second, third and fourth digital storage devices each comprises a high speed magnetic disk drive, wherein said circuit means for retrieving digital side A and side B program-representing signals is adapted to retrieve said signals at the same time digital information is being stored in said first and second storage devices, and wherein said digital switch means comprises bi-directional switch means for transferring digital program-representing information back and forth between predetermined files of said first and second storage devices and predetermined files of said third and fourth storage devices.

18. Apparatus for duplicating audio program-representing signals as claimed in claim 16, wherein the signals recorded on said master sources are analog signals and said means for applying signals reproduced therefrom to said first and second digital storage devices includes separate analog-to-digital converter means for separately converting the reproduced side A and side B signals to digital signals, and wherein said duplicating means includes digital-to-analog converter means for separately converting said retrieved side A and side B program-representing signals to analog signals for recording in an analog format on said slave magnetic tape.

19. A method for duplicating on a slave magnetic medium information signals representing a first program pre-recorded on a master medium, comprising the steps of:

reproducing from a master medium information signals representing said first program;

loading said reproduced signals in digital form into a first digital storage medium having capacity to store in digital form information to represent at least said first program, and storing said reproduced signals therein until said first program is scheduled for duplication;

when said first program is scheduled for duplication, transferring the digital signals representing said first program stored in said first digital storage medium to a second digital storage medium at a much faster rate than they were loaded into said first digital storage medium;

storing said transferred digital signals in said second digital storage medium until said first program is scheduled for duplication;

making a plurality of duplicate recordings of said first program by repeatedly retrieving from said second digital storage medium digital signals representing said first program at a predetermined bit rate and applying said retrieved signals, each time they are retrieved, to a slave magnetic medium of a duplicator which is driven at a speed which is equivalent to said predetermined bit rate; and concurrently with the making of duplicate recordings of said first program, loading into said first digital storage medium in digital form information signals representing a second program reproduced from a master medium;

whereby to maximize efficiency of equipment utilization by reducing the idle time of duplicators to approximately the time required to transfer program-representing digital signals from said first digital storage medium to said second digital storage medium.

20. Method according to claim 19, wherein the program-representing signals pre-recorded on said master medium are in analog form;

wherein said step of loading signals reproduced from said master medium into said first digital storage medium includes the step of converting the reproduced signals to digital form; and wherein the step of applying retrieved signals representing said first program to said slave magnetic medium includes the step of converting the retrieved signals from digital to analog form.

21. Apparatus for duplicating on a slave magnetic medium signals representing a first program of given duration pre-recorded on a master medium, comprising:

means for reproducing from said master medium signals representing said first program;

means including first digital storage means having capacity to store in digital form information to represent at least said first program into which said reproduced signals are loaded in digital form and stored until said first program is scheduled for duplication;

second digital storage means having capacity to store in digital form information to represent at least said first program;

means coupling said first digital storage means to said second digital storage means including digital switch means for transferring digital signals stored in said first digital storage means representing said first program to said second digital storage means in a time much shorter than the time required for reproducing the corresponding signals from said master medium and loading them into said first digital storage means; and duplicating means including means adapted to operate at the same time digital information which represents programs other than said first program is being loaded into said first digital storage means for repeatedly retrieving from said second digital storage means digital signals representing said first program at a predetermined bit rate and applying said retrieved signals, each time they are retrieved, to a slave magnetic medium which is driven at a speed which is equivalent to said predetermined bit rate for making a duplicate recording;

whereby to maximize efficiency of equipment utilization by reducing idle time of said duplicating means to approximately the time required to transfer digital signals representing a program from said first digital storage means to said second digital storage means, and to enable signals pre-recorded on a master medium representing a second program to be reproduced and loaded into said first digital storage means concurrently with the making of duplicate recordings of said first program.

22. Apparatus according to claim 21 for duplicating program-representing signals pre-recorded on said master medium in analog form, wherein the means including said first digital storage means includes analog-to-digital converter means for converting signals derived from the master medium to digital form; and wherein the means included in said duplicating means for retrieving signals from said second digital storage means and applying the retrieved signals to a slave magnetic medium includes digital-to-analog converter means for converting the retrieved digital signals to analog signals for making the duplicate recordings in an analog format.

* * * * *